US011329507B2

(12) United States Patent
Hall et al.

(10) Patent No.: US 11,329,507 B2
(45) Date of Patent: May 10, 2022

(54) CAMERA WITH REDUCED IMAGE NOISE RESULTING FROM WIRELESS CHARGING

(71) Applicant: Google LLC, Mountain View, CA (US)

(72) Inventors: Charles Hall, Chicago, IL (US); Ping Tong Chu, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/471,512

(22) PCT Filed: Jan. 8, 2019

(86) PCT No.: PCT/US2019/012771
§ 371 (c)(1),
(2) Date: Jun. 19, 2019

(87) PCT Pub. No.: WO2020/005315
PCT Pub. Date: Jan. 2, 2020

(65) Prior Publication Data
US 2021/0359545 A1 Nov. 18, 2021

Related U.S. Application Data

(60) Provisional application No. 62/691,708, filed on Jun. 29, 2018.

(51) Int. Cl.
*H02J 50/10* (2016.01)
*H02J 7/00* (2006.01)
(Continued)

(52) U.S. Cl.
CPC .......... *H02J 50/10* (2016.02); *H02J 7/00712* (2020.01); *H02J 7/02* (2013.01); *H04N 5/2257* (2013.01); *H04N 5/247* (2013.01); *H04N 7/141* (2013.01)

(58) Field of Classification Search
USPC ................ 455/41.1, 573, 296, 298
See application file for complete search history.

(56) References Cited

U.S. PATENT DOCUMENTS

| 2013/0055005 | A1* | 2/2013 | Lee | H04B 15/005 |
| | | | | 713/501 |
| 2015/0326062 | A1 | 11/2015 | Gonzalez Valdez et al. | |
| 2017/0025887 | A1* | 1/2017 | Hyun | H04B 5/0037 |

FOREIGN PATENT DOCUMENTS

| DE | 2525469 | * | 9/2011 | ............... H02J 7/02 |
| EP | 2525469 A2 | | 11/2012 | |
| JP | 2013132139 | * | 12/2011 | ............... H02J 7/00 |

OTHER PUBLICATIONS

Response to Communication Pursuant to Rules 161(1) and 162 EPC dated Oct. 9, 2020 from counterpart European Application No. 19702730.3, filed Mar. 24, 2021, 5 pp.

(Continued)

*Primary Examiner* — Maria El-Zoobi
(74) *Attorney, Agent, or Firm* — Shumaker & Sieffert, P.A.

(57) ABSTRACT

An example method includes receiving, by a mobile computing device, electrical power via a wireless charging link between the mobile computing device and a wireless charging device; and responsive to an activation state of a camera of the mobile computing device, selectively adjusting, by the mobile computing device, one or more parameters of the wireless charging link, wherein wireless charging via the wireless charging link with the adjusted one or more parameters generates less noise in images captured by the camera while the mobile computing device receives electrical power via the wireless charging link than wireless charging with unadjusted one or more parameters.

20 Claims, 5 Drawing Sheets

(51) Int. Cl.
      *H02J 7/02*       (2016.01)
      *H04N 5/225*    (2006.01)
      *H04N 5/247*    (2006.01)
      *H04N 7/14*      (2006.01)

(56) References Cited

OTHER PUBLICATIONS

International Preliminary Report on Patentability from International Application No. PCT/US2019/012771, dated Jan. 7, 2021, 8 pp.
"Introduction to the Power Class 0 Specification", Wireless Power Consortium, Version 1.2.3, Feb. 2017, 16 pp.
"The Qi Wireless Power Transfer System Power Class 0 Specification, Parts 1 and 2: Interface Definitions", Wireless Power Consortium, Version 1.2.3, Feb. 2017, 165 pp.
"The Qi Wireless Power Transfer System Power Class 0 Specification, Part 4: Reference Designs", Wireless Power Consortium, Version 1.2.3, Feb. 2017, 336 pp.
"Powered for iPhone", Logitech [online]. Retrieved from: <https://www.logitech.com/en-us/product/powered-phone-wireless-charging>, First Accessed on Aug. 7, 2018, 13 pp.
International Search Report and Written Opinion of International Application No. PCT/US2019/012771, dated Jan. 8, 2019, 13 pp.

\* cited by examiner

CAMERA WITH REDUCED IMAGE NOISE RESULTING FROM WIRELESS CHARGING

BACKGROUND

Some computing devices include a camera capable of capturing still and or video images. Additionally, some computing devices may include wireless charging functionality to charge or power each of the computing devices without the need for a charging cable between each computing device and a charging source.

SUMMARY

In general, techniques of this disclosure are directed to reducing noise in images captured by cameras of computing devices that are being wirelessly powered or charged. An example device may be wirelessly charged by transducing a wireless energy signal (e.g., an AC magnetic field) into an electrical signal, which is then used to charge a battery of the device or otherwise power components of the device. In some examples, one or more parameters of the wireless energy signal may undesirably induce noise in images captured by a camera of the example device. In accordance with one or more techniques of this disclosure, the example device may selectively adjust one or more parameters of the wireless energy signal responsive to an activation state of the camera. For instance, when the camera is activated while the device is being wirelessly charged, the device may adjust a frequency of the wireless energy signal such that images captured by the camera while the device is being wirelessly charged with the adjusted frequency include less noise than images captured by the camera while the device is being wirelessly charged with the unadjusted frequency. In this way, the device may reduce the amount of noise in images captured by the camera without having to suspend wireless charging.

In one example, a method includes receiving, by a mobile computing device, electrical power via a wireless charging link between the mobile computing device and a wireless charging device; and responsive to an activation state of a camera of the mobile computing device, selectively adjusting, by the mobile computing device, one or more parameters of the wireless charging link, wherein wireless charging via the wireless charging link with the adjusted one or more parameters generates less noise in images captured by the camera while the mobile computing device receives electrical power via the wireless charging link than wireless charging with unadjusted one or more parameters.

In another example, a mobile computing device includes a camera; a wireless power receiver; at least one processor; and at least one non-transitory computer-readable storage medium storing instructions that are executable by the at least one processor to: cause the wireless power receiver to receive electrical power via a wireless charging link between the mobile computing device and a wireless charging device; and responsive to an activation state of the camera, selectively adjust one or more parameters of the wireless charging link, wherein wireless charging via the wireless charging link with the adjusted one or more parameters generates less noise in images captured by the camera while the mobile computing device receives electrical power via the wireless charging link than wireless charging with unadjusted one or more parameters.

In another example, a non-transitory computer-readable storage medium storing instructions that, when executed, cause at least one processor of a mobile computing device to: cause a wireless power receiver of the mobile computing device to receive electrical power via a wireless charging link between the mobile computing device and a wireless charging device; and responsive to an activation state of a camera of the mobile computing device, selectively adjust one or more parameters of the wireless charging link, wherein wireless charging via the wireless charging link with the adjusted one or more parameters generates less noise in images captured by the camera while the mobile computing device receives electrical power via the wireless charging link than wireless charging with unadjusted one or more parameters.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
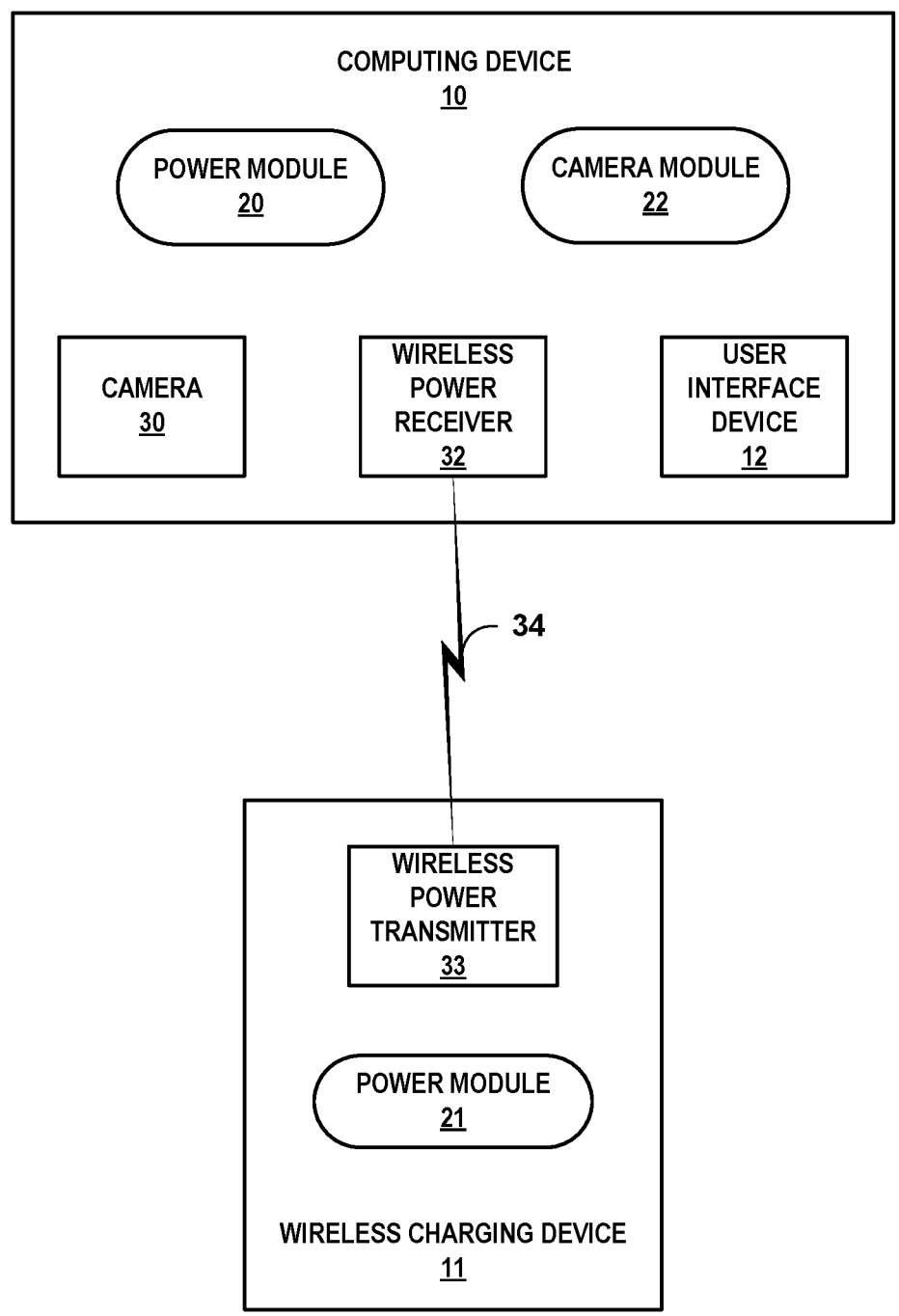
FIG. 1 is a conceptual diagram illustrating an example computing system with an example computing device configured to wirelessly receive power from an example wireless charging device, in accordance with one or more aspects of the present disclosure.

FIG. 1 is a conceptual diagram illustrating an example computing system 1 with an example computing device 10 configured to wirelessly receive power from example wireless charging device 11, in accordance with one or more aspects of the present disclosure. Computing system 1 of FIG. 1 is an example computing system that includes computing device 10 and wireless charging device 11. Computing system 1, in other examples, may also include other external devices, such as a server device, a network, or other camera devices.

In the example of FIG. 1, computing device 10 can be a mobile phone. However, computing device 10 may also be any other type of mobile computing device such as a camera device, a tablet computer, a personal digital assistant (PDA), a laptop computer, a gaming system, a media player, an e-book reader, a television platform, an automobile navigation system, or a wearable computing device (e.g., a computerized watch, computerized eyewear, a computerized glove).

As shown in FIG. 1, computing device 10 includes a user interface device (UID) 12. UID 12 of computing device 10 may function as an input device for computing device 10 and as an output device. UID 12 may be implemented using various technologies. For instance, UID 12 may function as an input device using a presence-sensitive input screen, such as a resistive touchscreen, a surface acoustic wave touchscreen, a capacitive touchscreen, a projective capacitance touchscreen, a pressure sensitive screen, an acoustic pulse recognition touchscreen, miniature radar, or another presence-sensitive display technology. UID 12 may function as an output (e.g., display) device using any one or more display devices, such as a liquid crystal display (LCD), dot matrix display, light emitting diode (LED) display, organic light-emitting diode (OLED) display, e-ink, or similar monochrome or color display capable of outputting visible information to a user of computing device 10.

UID 12 of computing device 10 may include a presence-sensitive display that may receive tactile input from a user of computing device 10. UID 12 may receive indications of the tactile input by detecting one or more gestures from a user of computing device 10 (e.g., the user touching or pointing to one or more locations of UID 12 with a finger or a stylus pen). UID 12 may present output to a user, for instance at a presence-sensitive display. UID 12 may present the output as a graphical user interface, which may be associated with functionality provided by computing device 10. For example, UID 12 may present various user interfaces of components of a computing platform, operating system, applications, or services executing at or accessible by computing device 10 (e.g., an electronic message application, an Internet browser application, a mobile operating system, etc.). A user may interact with a respective user interface to cause computing device 10 to perform operations relating to a function. In accordance with the techniques of this disclosure, user interface (UI) module 21 of computing device 10 may utilize UID 12 to show image preview 16 when computing device 10 is operating in an image capture mode.

Computing device 10 may include various input devices. For instance, computing device 10 may include camera 30. Camera 30 may be an optical instrument for recording or capturing images. Camera 30 may capture individual still photographs or sequences of images constituting videos or movies. Camera 30 may be a physical component of computing device 10. Camera 30 may perform various functions, such as capturing one or more images, focusing on one or more objects, and utilizing various flash settings, among other things.

Computing device 10 may include power module 20 and camera module 22. Modules 20 and 22 may perform operations described using software, hardware, firmware, or a mixture of hardware, software, and firmware residing in and/or executing at computing device 10. Computing device 10 may execute modules 20 and 22 with one or more processors. Computing device 10 may execute modules 20 and 22 as a virtual machine executing on underlying hardware. Modules 20 and 22 may execute as a service or component of an operating system or computing platform. Modules 20 and 22 may execute as one or more executable programs at an application layer of a computing platform. UID 12 and modules 20 and 22 may be otherwise arranged remotely to and remotely accessible to computing device 10, for instance, as one or more network services operating at a network in a network cloud.

Camera module 22 may perform various tasks to manage operation of camera 30. For instance, camera module 22 may control an activation state of camera 30 (e.g., turn camera 30 on or off), and control particular features of camera 30 (e.g., based on inputs received at UID 12). computing device. As one example, responsive to an input received at UID 12 (e.g., a user starting a video call), camera module 22 may turn camera 30. As another example, responsive to an input received at UID 12, camera module 22 may cause camera to "snap" or capture a still image or start/stop recording of a video image.

Wireless power receiver 32 may include various hardware components configured to wirelessly receive power from another device (e.g., wireless charging device 11). In some examples, wireless power receiver 32 may be capable of wireless charging in accordance with a standard, such as a version of the Qi Wireless Power Transfer System standard or any other wireless charging standard. Where wireless power receiver 32 is capable of inductive wireless charging, wireless power receiver 32 may include one or more transformer coils capable of transducing an AC magnetic field (e.g., wireless charging link 34) into an AC electrical signal and a rectifier capable of converting the AC electrical signal into a DC electrical signal.

Power module 20 may perform various tasks to manage power at computing device 10. For instance, power module 20 may control operation of wireless power receiver 32 to facilitate the wireless charging of computing device 10 (e.g., to enable charging of a battery and/or powering of components of computing device 10 without the need to plus computing device 10 into a charger).

Wireless charging device 11 represents any device capable of wirelessly providing power to one or more other devices. Examples of wireless charging device 11 include, but are not limited to, mats, power banks, vehicle arm rests, cradles, table tops, or the like. As shown in the example of FIG. 1, wireless charging device 11 may include wireless power transmitter 33 and power module 21.

Wireless power transmitter 33 may include various hardware components configured to wirelessly transmit power to one or more other devices (e.g., computing device 10). In some examples, wireless power transmitter 33 may be capable of wireless charging in accordance with a standard, such as the Qi standard (Qi Wireless Power Transfer System, Version 1.2.3, February 2017) or any other wireless charging standard. Where wireless power transmitter 33 is capable of inductive wireless charging, wireless power transmitter 33 may include one or more coils capable of transducing an AC electrical signal into an AC magnetic field (e.g., wireless charging link 34). Wireless power transmitter 33 may source the AC electrical signal from one or more batteries integral or external to wireless charging device 11 (e.g., via an inverter), an electrical outlet (e.g., electrical mains outlet, USB plug on another device, cigarette lighter plug in a vehicle, etc.), or any other source of electrical power.

Power module 21 may perform various tasks to manage wireless charging provided by wireless charging device 11. For instance, power module 21 may control operation of wireless power transmitter 33 to facilitate the wireless charging of computing device 10 (e.g., to enable charging of a battery and/or powering of components of computing device 10 without the need to plug computing device 10 into a charger).

Wireless power transmitter 33 may transmit power to wireless power receiver 32 via wireless charging link 34. In some examples, wireless charging link 34 may include an AC magnetic field having a certain operating frequency. The term "operating frequency" may refer to the oscillation frequency of a power signal, which may be the oscillating magnetic flux that is enclosed by a primary coil (e.g., a coil or coils within wireless power transmitter 33).

In the Qi standard, the operating frequency typically is in the range of 87 to 205 kHz. Power module 21 may control the amount of power transferred to computing device 10 by adjusting the operating frequency of wireless charging link 34. In some examples, a lower operating frequency may result in a higher amount of power transferred and a higher frequency may result in a lower amount of power transferred.

In some examples, in addition to wirelessly transferring power from wireless charging device 11 to computing device 10, wireless charging link 34 may enable the exchange of information between wireless charging device 11 and computing device 10. For instance, wireless power receiver 32 may modulate the amount of power that it draws from a power signal (e.g., the oscillating magnetic flux that is enclosed by a primary coil (e.g., a coil or coils within wireless power transmitter 33)). Power module 21 of wireless charging device 11 may detect this as a modulation of the current through and/or voltage across a coil of wireless power transmitter 33. In other words, power module 20 and power module 21 may use an amplitude modulated power signal to provide a communications channel between computing device 10 and wireless charging device 11.

In some scenarios, it may be desirable to utilize camera 30 while computing device 10 is being wirelessly charged. For instance, where wireless charging device 11 is an angled charging cradle, it may be desirable to utilize computing device 10, and thus camera 30, for a video call or to otherwise capture images. However, the operation of wireless charging link 34 may negatively impact the operation of camera 30. For instance, the operation of wireless charging link 34 at certain operating frequencies may induce horizontal row noise in images captured by camera 30.

In accordance with one or more techniques of this disclosure, computing device 10 may selectively adjust one or more parameters of wireless charging link 34 based on an activation state of camera 30. For instance, in response to camera 30 being activated (e.g., powered on), power module 20 may selectively change an operating frequency of wireless charging link 34 to avoid operating frequencies that negatively impact operation of camera 30. In some examples, these frequencies may be known frequencies that are predetermined and stored by computing device as a list of frequencies to avoid during operation of camera 30. In some examples, these frequencies may be determined on the fly (e.g., at run time.). For instance, computing device 10 may determine that a current operating frequency is negatively impacting operation of camera 30 and selectively change the operating frequency as a result. In some examples, the determination of whether a current operating frequency is negatively impacting operation of camera 30 may be performed using machine learning.

In some examples, computing device 10 may not have direct control over the parameters of wireless charging link 34. For instance, the operating frequency of wireless charging link 34 may be set by power module 21 of wireless charging device 11. As discussed above, power module 21 may adjust the operating frequency of wireless charging link 34 to control the amount of power transferred to computing device 10. As such, computing device 10 may communicate with wireless charging device 11 to adjust the parameters of wireless charging link 34. For instance, to adjust the operating frequency of wireless charging link 34, power module 20 may adjust an amount of power requested to be transferred. In response to receiving the request, power module 21 may adjust the operating frequency of wireless charging link 34 to accommodate the adjusted amount of power.

Power module 20 may detect the adjusted operating frequency of wireless charging link 34 and determine whether the adjusted frequency is included in the list of frequencies to avoid during operation of camera 30. If the adjusted frequency is not included in the list of frequencies to avoid during operation of camera 30, power module 20 may refrain from requesting adjustments to the amount of power to be transferred. If the adjusted frequency is included in the list of frequencies to avoid during operation of camera 30, power module 20 may continue to make adjustments to the amount of power to be transferred until the operating frequency of wireless charging link 34 is not included in the list. In this way, power module 20 may enable a reduction in the noise in images captured by camera 30 while computing device 10 is receiving power via wireless charging link 34.

In some examples, computing device 10 may temporarily cease power transfer while camera 30 is active and/or while camera 30 is taking a picture or recording video. For instance, as opposed to changing to a different operating frequency, computing device 10 may deactivate wireless charging link 34 in response to camera 30 being activated. Similarly, if camera 30 is already activated, computing device 10 may refrain from establishing wireless charging link 34 until camera is deactivated. In some examples, computing device 10 may determine that camera 30 is active whenever camera 30 is generating image data. In other examples, computing device 10 may determine that camera 30 is active only when camera 30 is taking a picture or recording video (i.e., computing device 10 may not determine that camera 30 is active when camera 30 is being used as a viewfinder and no image data is being stored).

Figure 2:
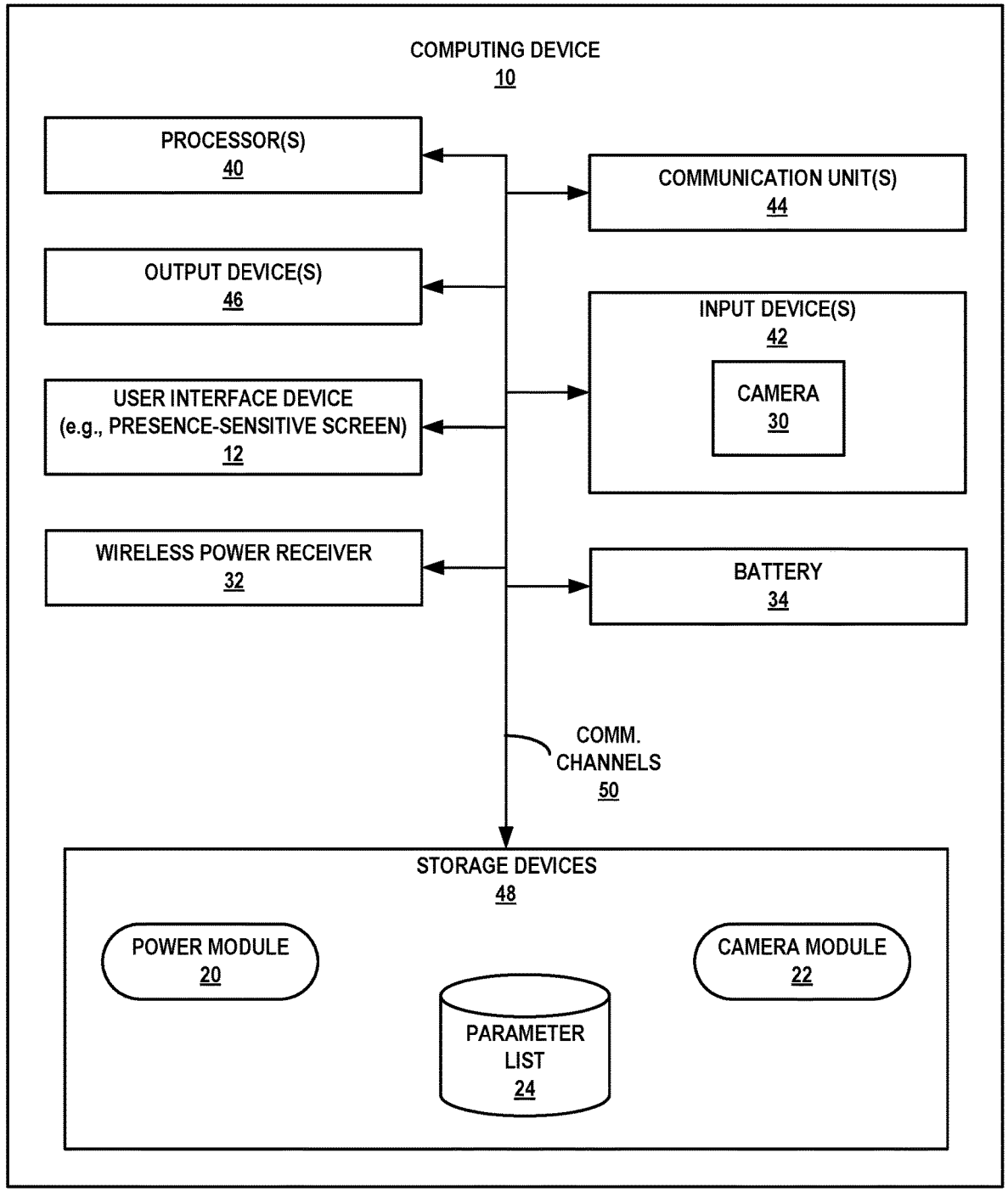
FIG. 2 is a block diagram illustrating an example computing device 10 configured to adjust a wireless charging link based on an activation state of a camera, in accordance with one or more aspects of the present disclosure.

FIG. 2 is a block diagram illustrating an example computing device 10 configured to adjust a wireless charging link based on an activation state of a camera, in accordance with one or more aspects of the present disclosure. Computing device 10 of FIG. 2 is described below within the context of system 1 of FIG. 1. FIG. 2 illustrates only one particular example of computing device 10 and many other examples of computing device 10 may be used in other instances. In the example of FIG. 2, computing device 10 may be a wearable computing device, a mobile computing device, or any other computing device including or controlling a camera and capable of wireless charging. Computing device 10 of FIG. 2 may include a subset of the components included in example computing device 10 or may include additional components not shown in FIG. 2.

As shown in the example of FIG. 2, computing device 10 includes user interface device 12 ("UID 12"), one or more processors 40, one or more input devices 42, one or more communication units 44, one or more output devices 46, one or more storage devices 48, wireless power receiver 32, and battery 34. Input devices 42 include camera 30. Storage devices 48 of computing device 10 also include power module 20, UI module 21, camera module 22, and parameter list 24. Power module 20, UI module 21, and camera module 22 may rely on information stored as parameter list 24 at storage device 48. In other words, as is described in more detail below, power module 20, UI module 21, and camera module 22 may be operable by processors 40 to perform read/write operations on information, stored as parameter list 24, at storage device 48. Power module 20, UI module 21, and camera module 22 may access the information stored in parameter lists 24 to perform a function of computing device 10.

Communication channels 50 may interconnect each of the components 12, 20, 21, 22, 24, 30, 32, 34, 40, 42, 44, 46, and 48 for inter-component communications (physically, communicatively, and/or operatively). In some examples, communication channels 50 may include a power bus, a system bus, a network connection, an inter-process communication data structure, or any other method for communicating data or transferring power.

One or more output devices 46 of computing device 10 may generate output. Examples of output are tactile, audio, and video output. Output devices 46 of computing device 10, in one example, includes a presence-sensitive display, sound card, video graphics adapter card, speaker, cathode ray tube (CRT) monitor, liquid crystal display (LCD), or any other type of device for generating output to a human or machine.

One or more input devices 42 of computing device 10 may receive input. Examples of input are tactile, audio, and video input. Input devices 42 of computing device 10, in some examples, includes a presence-sensitive display, touch-sensitive screen, mouse, keyboard, voice responsive system, video camera, microphone, sensor, or any other type of device for detecting input from a human or machine.

Camera 30 of input devices 42 may be similar and include some or all of the same features as camera 30 of FIG. 1. Camera 30 may be an optical instrument for recording or capturing images. Camera 30 may capture individual still photographs or sequences of images that make up videos or movies. Camera 30 may be a physical component of computing device 10. Camera 30 may include a camera application that acts as an interface between a user of computing device 10 and the functionality of camera 30. Camera 30 may perform various functions, such as capturing one or more images, and utilizing various flash settings, among other things. In some examples, camera 30 may be a single camera. In other examples, camera 30 may include multiple cameras. For instance, camera 30 may include one or more front facing cameras (e.g., one or more "selfie" cameras) and one or more rear facing cameras.

One or more communication units 44 of computing device 10 may communicate with external devices via one or more wired and/or wireless networks by transmitting and/or receiving network signals on the one or more networks. Examples of communication unit 44 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

UID 12 is similar to UID 12 of FIG. 1 and may include some or all of the same features as UID 12 of FIG. 1. In some examples, UID 12 of computing device 10 may include functionality of input devices 42 and/or output devices 46. In the example of FIG. 2, UID 12 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, presence sensitive input device also provides output to a user using tactile, audio, or video stimuli as described with respect to output device 46, e.g., at a display.

While illustrated as an internal component of computing device 10, UID 12 also represents and external component that shares a data path with computing device 10 for transmitting and/or receiving input and output. For instance, in one example, UID 12 represents a built-in component of computing device 10 located within and physically connected to the external packaging of computing device 10 (e.g., a screen on a mobile phone). In another example, UID 12 represents an external component of computing device 10 located outside and physically separated from the packaging of computing device 10 (e.g., a monitor, a projector, etc. that shares a wired and/or wireless data path with a tablet computer).

One or more storage devices 48 within computing device 10 may store information for processing during operation of computing device 10 (e.g., computing device 10 may store data (e.g., parameter list 24) that modules 20, 21, and 22 access during execution at computing device 10). In some examples, storage device 48 is a temporary memory, meaning that a primary purpose of storage device 48 is not long-term storage. Storage devices 48 on computing device 10 may configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 48, in some examples, include one or more computer-readable storage media. Storage devices 48 may be configured to store larger amounts of information than volatile memory. Storage devices 48 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 48 may store program instructions and/or information (e.g., data) associated with modules 20, 21, and 22, parameter list 24.

One or more processors 40 may implement functionality and/or execute instructions within computing device 10. For example, processors 40 on computing device 10 may receive and execute instructions stored by storage devices 48 that execute the functionality of modules 20 and 22. Processors 40 may execute instructions of modules 20 and 22 to cause to perform various actions or functions of computing device 10.

Power module 20 and camera module 22 may be additional examples of modules 20 and 22 from FIG. 1, including similar and some or all the same functionality of modules 20 and 22 from FIG. 1. For instance, power module 20 may manage the charging of battery 34 using power received via wireless power receiver 32.

Parameter list 24 may specify parameters of wireless charging links to avoid during operation of camera 30. For instance, parameter list 24 may include a list of frequencies to avoid during operation of camera 30. These frequencies may be predetermined and may be a function of various properties of camera 30. As such, the frequencies included in parameter list 24 may be pre-programmed. As discussed above, in some examples, camera 30 may include multiple cameras. In some of such examples, parameter list 24 may include separate lists for each of the cameras. For instance, parameter list 24 may include a list of frequencies to avoid during operation of a front facing camera of camera 30 and a list of frequencies to avoid during operation of a rear facing camera of camera 30. Some example frequencies to avoid include 24 kHz, 35 kHz, 47 k, 59 kHz, 70 kHz, 82 kHz, 94 kHz, 106 kHz, 118 kHz, 130 KHz (e.g., and other 12 kHz harmonics), 38 kHz, 76 kHz, 114 kHz, 152 kHz, 189 kHz (e.g., and other 38 kHz harmonics).

As discussed above and in accordance with one or more techniques of this disclosure, computing device 10 may selectively adjust one or more parameters of a wireless charging link based on an activation state of camera 30. For instance, in response to camera 30 being activated (e.g., powered on), power module 20 may determine whether parameters of the wireless charging link are included in parameter list 24. If parameters of the wireless charging link are not included in parameter list 24, power module, may refrain from adjusting the parameters based on the activation state of camera 30 (e.g., selectively not adjust). However, if parameters of the wireless charging link are included in parameter list 24, power module, may adjust the parameters of the wireless link to avoid parameters included in parameter list 24.

To illustrate, if an operating frequency of the wireless charging link is included in parameter list 24, power module 20 may adjust a frequency of the wireless charging link to a frequency not included in parameter list 24. As discussed above, in some examples, power module 20 may not be able to directly control the operating frequency of the wireless charging link. In some of such examples, power module 20 may adjust the operating frequency of the wireless charging link by varying the amount of power requested from the wireless charging source (e.g., wireless charging device 11 of FIG. 1). For instance, power module 20 may request a change to one or both of a voltage and/or a current set point. In one specific example where the wireless charging is in compliance with the Qi standard, power module 20 may adjust the Control Error Value in the Control Error Packet.

As discussed above, the wireless charging source may adjust the operating frequency of the wireless charging link in response to power modules 20's request for a different amount of power. In this way, power module 20 may adjust a parameter of the wireless charging link to a parameter not included in parameter list 24, thus reducing noise in images captured by camera 30.

Additionally, by adjusting the operating frequency, computing device 10 may enable the benefits of reduced noise without having to include camera state activation functionality in wireless charging device 11. Thus, the complexity and cost of wireless charging device 11 may not be increased as a result of these techniques.

In some examples, computing device 10 may cause camera 30 to capture multiple images while wireless charging at different operating frequencies. In such examples, computing device 10 may combine the images to remove adverse effects cause by the operating frequencies.

Throughout the disclosure, examples are described where a computing device and/or a computing system may analyze information associated with a computing device only if the computing device receives permission from the user to analyze the information. For example, in situations discussed above in which the computing device may collect or may make use of information associated with the user, including voice inputs or location information indicated by image data, the user may be provided with an opportunity to provide input to control whether programs or features of the computing device can collect and make use of user information or to dictate whether and/or how to the computing device may receive content that may be relevant to the user. In addition, certain data may be treated in one or more ways before it is stored or used by the computing device and/or computing system, so that personally-identifiable information is removed. For example, stored image data may be treated so that no personally identifiable information can be determined about the user. Thus, the user may have control over how information is collected about the user and used by the computing device.

Figure 3:
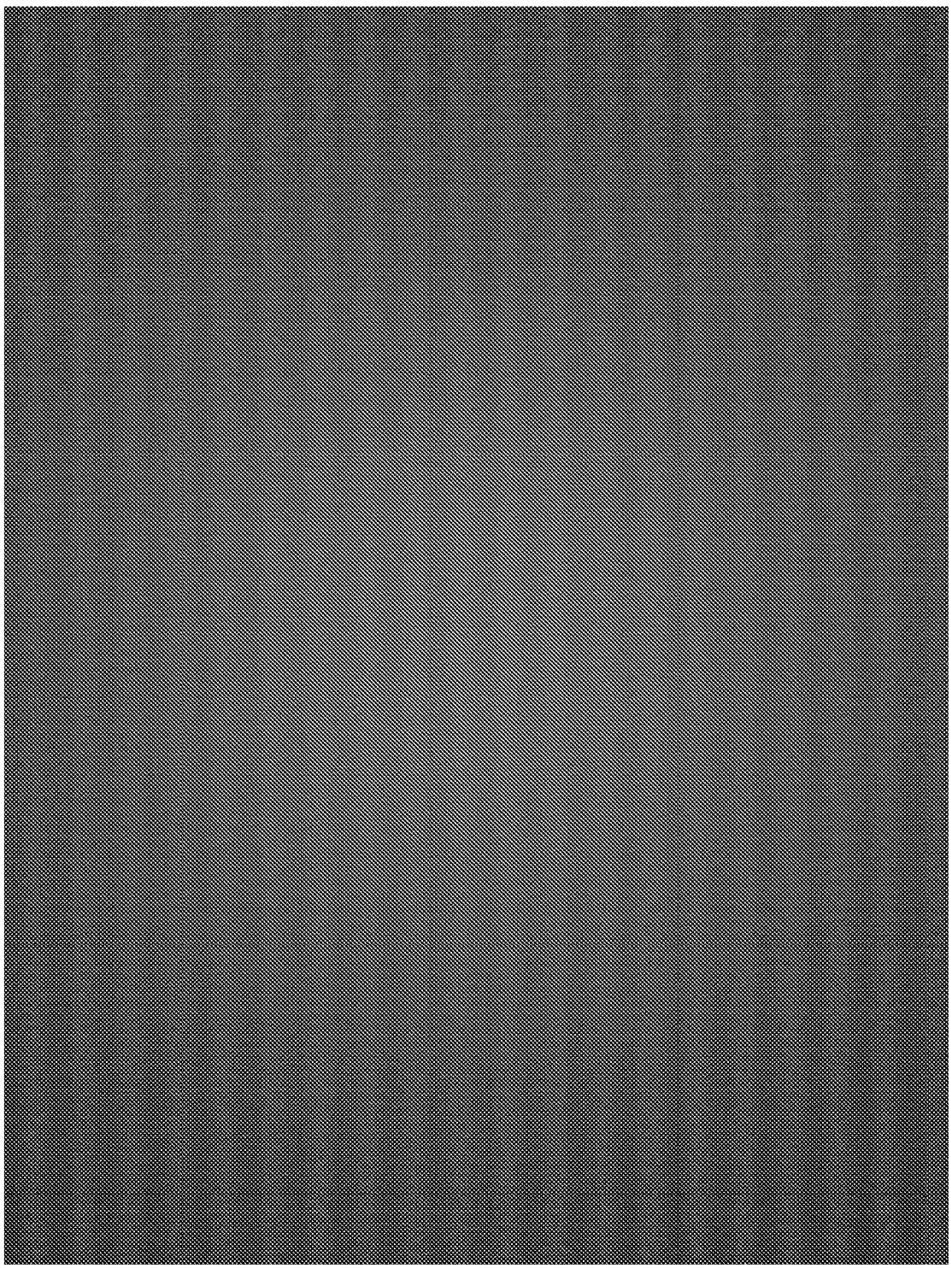
FIG. 3 is an image including noise that may be induced by wireless charging, in accordance with one or more aspects of the present disclosure.

FIG. 3 is an image including noise that may be induced by wireless charging, in accordance with one or more aspects of the present disclosure. As discussed above, a mobile computing device, such as computing device 10 of FIG. 1 and FIG. 2, may adjust one or more parameters of a wireless charging link to reduce the amount of noise included in images captured by a camera of the mobile computing device while the mobile computing device is receiving power via the wireless charging link.

Figure 4:
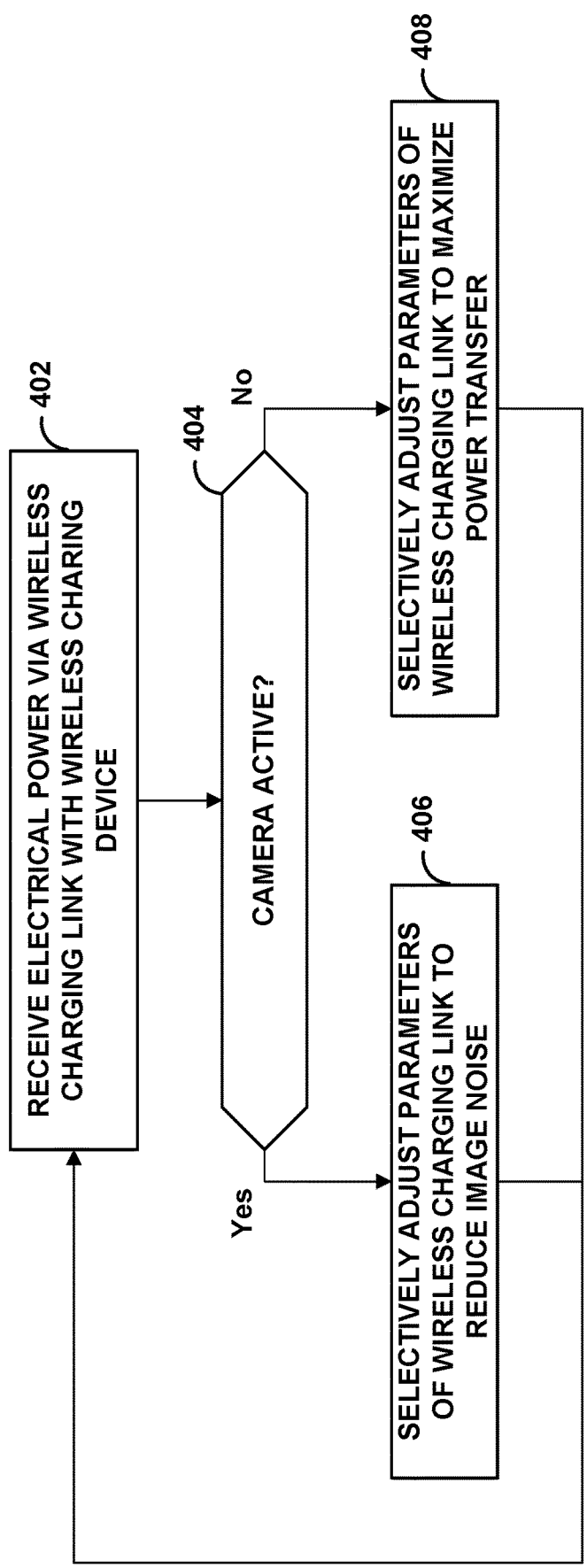
FIG. 4 is a flowchart illustrating example operations of an example computing device configured to adjust a wireless charging link based on an activation state of a camera, in accordance with one or more aspects of the present disclosure.

FIG. 4 is a flowchart illustrating example operations of an example computing device configured to adjust a wireless charging link based on an activation state of a camera, in accordance with one or more aspects of the present disclosure. The operations of computing device 10 are described within the context of system 1 of FIG. 1, and computing device 10 of FIG. 1 and FIG. 2.

Computing device 10 may receive electrical power via a wireless charging link with wireless charging device 11 (402). For instance, power module 21 may cause an alternating electrical current through one or more coils of wireless transmitter 33, which generates an alternating magnetic field in accordance with Faraday's law. This magnetic field (e.g., wireless power link 34) is in turn picked up by a coil of wireless power receiver 32, which transforms the magnetic field back into an alternating current that power module 20 may use to charge a battery (e.g. battery 34) or power other components of computing device 10.

Computing device 10 may selectively adjust one or more parameters of the wireless charging link based on an activation state of a camera of computing device 10. For instance, power module 20 may determine whether camera 30 is active or has been activated (404). If camera 30 is not active ("No" branch of 404), power module 30 may selectively adjust parameters of the wireless charging link without regard to reducing image noise. For instance, power module 30 may selectively adjust parameters of the wireless charging link to maximize the amount of power transferred over the wireless charging link (e.g., to reduce charge time) (408).

If camera 30 is active or has been activated ("Yes" branch of 404), power module 20 may selectively adjust parameters of the wireless charging link to reduce image noise (406). For instance, power module 20 may determine (e.g., based on measurements performed by wireless power receiver 32) whether an operating frequency of the wireless charging link (e.g., of the alternating current) is included within a list of frequencies to avoid during operation of camera 30 (e.g., parameters list 24). As one example, power module 20 may determine that the current operating frequency of the wireless charging link is included within the list where the current operating frequency is exactly included in the list of frequencies to avoid. As another example, power module 20 may determine that the current operating frequency of the wireless charging link is included within the list where the current operating frequency is within a certain range or band (e.g., +/−2 kHz, +/−4 kHz, +/−5%, etc.) of a frequency included in the list of frequencies to avoid.

If the operating frequency of the wireless charging link is included within a list of frequencies to avoid during operation of camera 30, power module 20 may adjust (e.g., reduce or increase) the amount of power requested (e.g., the voltage and/or current set points) from wireless charging device 11. In some examples, power module 20 may continue to adjust the amount of power requested until the operating frequency is not included in the list of frequencies to avoid.

When camera 30 is no longer active, power module 20 may selectively adjust parameters of the wireless charging link without regard to reducing image noise. For instance, power module 20 may change the receive current and voltage setpoint back to default values.

As discussed above, in some examples, computing device 10 may optimize for image quality. For instance, computing device 10 may adjust the operating frequency to avoid operating frequencies that negatively impact operation of camera 30. In other examples, computing device 10 may optimize for both image quality and power transfer. For instance, computing device 10 may identify a minimal acceptable image quality level and adjust the parameters of the wireless charging link to achieve the maximum power transfer rate that does not cause images captured by camera 30 to drop below the minimal acceptable image quality level.

Figure 5:
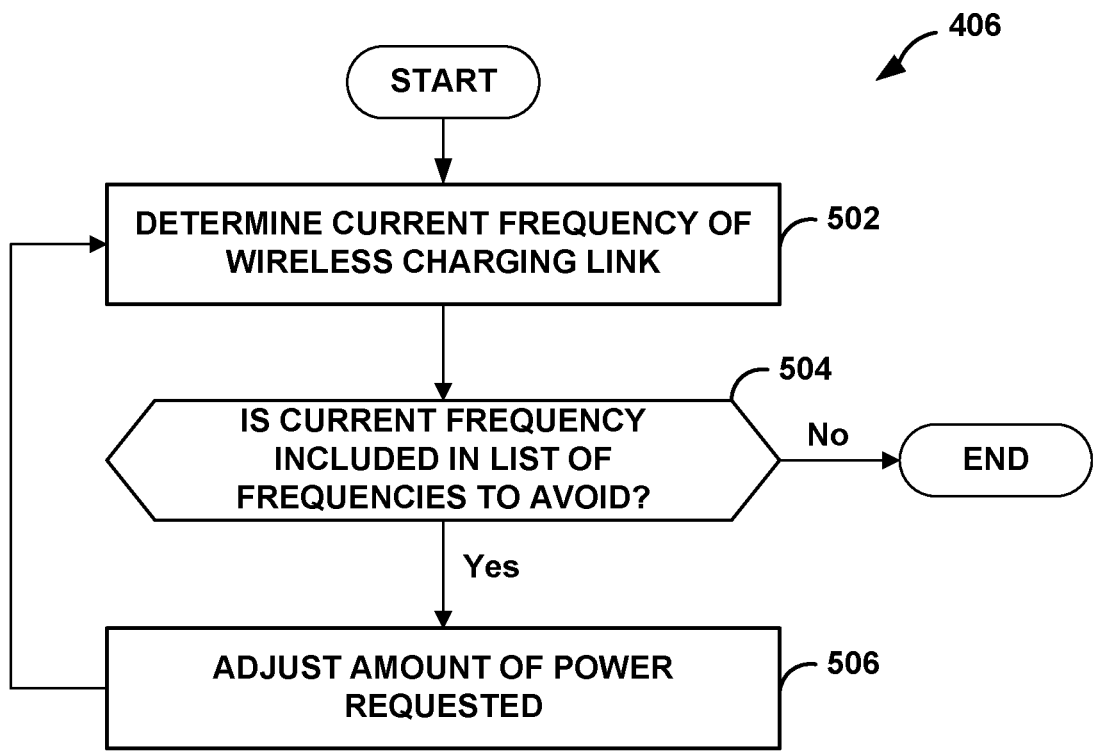
FIG. 5 is a flowchart illustrating example operations of an example computing device to selectively adjust a wireless charging link, in accordance with one or more aspects of the present disclosure.

FIG. 5 is a flowchart illustrating example operations of an example computing device to selectively adjust a wireless charging link, in accordance with one or more aspects of the present disclosure. The operations of computing device 10 are described within the context of system 1 of FIG. 1, and computing device 10 of FIG. 1 and FIG. 2.

The operations illustrated in FIG. 5 are one example of operation 406 of FIG. 4 in which computing device 10 selectively adjusts parameters of the wireless charging link to reduce image noise. As shown in FIG. 5, computing device 10 may determine a current frequency of the wireless charging link (502). For instance, power module 20 may determine a frequency of the alternating current transduced by wireless power receiver 32.

Computing device 10 may determine whether the current frequency is included in the list of frequencies to avoid during operation of the camera (504). As discussed above, computing device 10 may include multiple cameras and power module 20 may compare the current frequency of the link to a list (or lists) corresponding to the camera (or cameras) that are active.

If the current frequency is included in the list of frequencies to avoid ("Yes" branch of 504), computing device 10 may adjust the operating frequency. For instance, computing device 10 may adjust the amount of power requested (506). In one specific example where the wireless charging is in compliance with the Qi standard, power module 20 may adjust the Control Error Value in the Control Error Packet.

Computing device 10 may then determine the current frequency of the wireless charging link (e.g., after the wireless charging device has accommodated the request for the change in the amount of power) (502) and determine whether the new current frequency of the wireless charging link is included in the list of frequencies to avoid (504). Computing device 10 may repeat these steps until the current frequency of the wireless charging link is not included in the list of frequencies to avoid ("No" branch of 504), at which point the operation may proceed to operation 402 of FIG. 4.

The following numbered examples may illustrate one or more aspects of the disclosure:

Example 1. A method comprising: receiving, by a mobile computing device, electrical power via a wireless charging link between the mobile computing device and a wireless charging device; and responsive to an activation state of a camera of the mobile computing device, selectively adjusting, by the mobile computing device, one or more parameters of the wireless charging link, wherein wireless charging via the wireless charging link with the adjusted one or more parameters generates less noise in images captured by the camera while the mobile computing device receives electrical power via the wireless charging link than wireless charging with unadjusted one or more parameters.

Example 2. The method of example 1, wherein selectively adjusting the one or more parameters of the wireless charging link comprises: responsive to determining that a current frequency of the wireless charging link is included in a list of frequencies to avoid during operation of the camera, adjusting a frequency of the wireless charging link.

Example 3. The method of any combination of examples 1 and 2, wherein adjusting the frequency of the wireless charging link comprises adjusting an amount of power requested by the mobile computing device.

Example 4. The method of example 3, further comprising: responsive to determining, after adjusting the amount of power requested, that the current frequency of the wireless charging link is included in the list of frequencies to avoid during operation of the camera, re-adjusting the amount of power requested by the mobile computing device until the current frequency of the wireless charging link is included in the list of frequencies to avoid during operation of the camera.

Example 5. The method of any combination of examples 1-4, wherein adjusting the amount of power requested by the mobile computing device comprises reducing the amount of power requested by the mobile computing device.

Example 6. The method of any combination of examples 1-5, wherein the camera of the mobile computing device is a first camera of the mobile computing device, the method further comprising: responsive to an activation state of a second camera of the mobile computing device and to determining that the current frequency of the wireless charging link is included in a list of frequencies to avoid during operation of the second camera, adjusting the frequency of the wireless charging link.

Example 7. The method of any combination of examples 1-6, wherein selectively adjusting the one or more parameters responsive to the activation state of the camera of the mobile computing device comprises: selectively adjusting the one or more parameters responsive to determining that the camera of the mobile computing is activated while the mobile computing device is already receiving electrical power via the wireless charging link.

Example 8. The method of any combination of examples 1-6, wherein selectively adjusting the one or more parameters responsive to the activation state of the camera of the mobile computing device comprises: selectively adjusting the one or more parameters responsive to determining that the mobile computing device has started receiving electrical power via the wireless charging link while the camera of the mobile computing is already activated.

Example 9. The method of any combination of examples 1-8, further comprising: activating the camera for a video call, wherein selectively adjusting the one or more parameters responsive to the activation state of the camera of the mobile computing device comprises: selectively adjusting the one or more parameters responsive to determining that the camera of the mobile computing is active.

Example 10. A mobile computing device comprising: a camera; a wireless power receiver; at least one processor; and at least one non-transitory computer-readable storage medium storing instructions that are executable by the at least one processor to: cause the wireless power receiver to receive electrical power via a wireless charging link between the mobile computing device and a wireless charging device; and responsive to an activation state of the camera, selectively adjust one or more parameters of the wireless charging link, wherein wireless charging via the wireless charging link with the adjusted one or more parameters generates less noise in images captured by the camera while the mobile computing device receives electrical power via the wireless charging link than wireless charging with unadjusted one or more parameters.

Example 11. The mobile computing device of example 10, wherein, to selectively adjust the one or more parameters of the wireless charging link, the instructions are executable by the at least one processor to: adjust, responsive to determining that a current frequency of the wireless charging link is included in a list of frequencies to avoid during operation of the camera, a frequency of the wireless charging link.

Example 12. The mobile computing device of any combination of examples 10 and 11, wherein, to adjust the frequency of the wireless charging link, the instructions are executable by the at least one processor to adjust an amount of power requested by the mobile computing device.

Example 13. The mobile computing device of any combination of examples 10-12, further comprising instructions executable by the at least one processor to: re-adjust, responsive to determining, after adjusting the amount of power requested, that the current frequency of the wireless charging link is included in the list of frequencies to avoid during operation of the camera, the amount of power requested by the mobile computing device until the current frequency of the wireless charging link is included in the list of frequencies to avoid during operation of the camera.

Example 14. The mobile computing device of any combination of examples 10-13, wherein, to adjust the amount of power requested by the mobile computing device, the instructions are executable by the at least one processor to reduce the amount of power requested by the mobile computing device.

Example 15. The mobile computing device of any combination of examples 10-14, wherein the camera of the mobile computing device is a first camera of the mobile computing device, further comprising instructions executable by the at least one processor to: adjust, responsive to an activation state of a second camera of the mobile computing device and to determining that the current frequency of the wireless charging link is included in a list of frequencies to avoid during operation of the second camera, the frequency of the wireless charging link.

Example 16. The mobile computing device of any combination of examples 10-15, wherein, to selectively adjust the one or more parameters responsive to the activation state of the camera of the mobile computing device, the instructions are executable by the at least one processor to: selectively adjust the one or more parameters responsive to determining that the camera of the mobile computing is activated while the mobile computing device is already receiving electrical power via the wireless charging link.

Example 17. The mobile computing device of any combination of examples 10-15, wherein, to selectively adjust the one or more parameters responsive to the activation state of the camera of the mobile computing device, the instructions are executable by the at least one processor to: selectively adjust the one or more parameters responsive to determining: selectively adjust the one or more parameters responsive to determining that the mobile computing device has started receiving electrical power via the wireless charging link while the camera of the mobile computing is already activated.

Example 18. The mobile computing device of any combination of examples 10-17, further comprising instructions executable by the at least one processor to: activate the camera for a video call, wherein, to selectively adjust the one or more parameters responsive to the activation state of the camera of the mobile computing device, the instructions are executable by the at least one processor to: selectively adjust the one or more parameters responsive to determining that the camera of the mobile computing is active.

Example 19. A non-transitory computer-readable storage medium storing instructions that, when executed, cause at least one processor of a mobile computing device to perform the method of any combination of examples 1-9.

Example 20. A mobile computing device comprising means for performing the method of any combination of examples 1-9.

Example 21. A method comprising any combination of examples 1-9.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A method comprising:
receiving, by a mobile computing device, electrical power via a wireless charging link between the mobile computing device and a wireless charging device; and
responsive to an activation state of a camera of the mobile computing device, selectively adjusting, by the mobile computing device, one or more parameters of the wireless charging link, wherein wireless charging via the wireless charging link with the adjusted one or more parameters generates less noise in images captured by the camera while the mobile computing device receives electrical power via the wireless charging link than wireless charging with unadjusted one or more parameters, wherein selectively adjusting the one or more parameters of the wireless charging link comprises adjusting a frequency of the wireless charging link.

2. The method of claim 1, wherein selectively adjusting the frequency of the wireless charging link comprises:
responsive to determining that a present frequency of the wireless charging link is included in a list of frequencies to avoid during operation of the camera, adjusting the frequency of the wireless charging link.

3. The method of claim 1, wherein adjusting the frequency of the wireless charging link comprises adjusting an amount of power requested by the mobile computing device.

4. The method of claim 3, further comprising:
responsive to determining, after adjusting the amount of power requested, that the present frequency of the wireless charging link is included in the list of frequencies to avoid during operation of the camera, re-adjusting the amount of power requested by the mobile computing device until the present frequency of the wireless charging link is included in the list of frequencies to avoid during operation of the camera.

5. The method of claim 3, wherein adjusting the amount of power requested by the mobile computing device comprises reducing the amount of power requested by the mobile computing device.

6. The method of claim 1, wherein the camera of the mobile computing device is a first camera of the mobile computing device, the method further comprising:
responsive to an activation state of a second camera of the mobile computing device and to determining that the present frequency of the wireless charging link is included in a list of frequencies to avoid during operation of the second camera, adjusting the frequency of the wireless charging link.

7. The method of claim 1, wherein selectively adjusting the one or more parameters responsive to the activation state of the camera of the mobile computing device comprises:
selectively adjusting the one or more parameters responsive to determining that the camera of the mobile computing is activated while the mobile computing device is already receiving electrical power via the wireless charging link.

8. The method of claim 1, wherein selectively adjusting the one or more parameters responsive to the activation state of the camera of the mobile computing device comprises:
selectively adjusting the one or more parameters responsive to determining that the mobile computing device has started receiving electrical power via the wireless charging link while the camera of the mobile computing is already activated.

9. The method of claim 1, further comprising:
activating the camera for a video call, wherein selectively adjusting the one or more parameters responsive to the activation state of the camera of the mobile computing device comprises:
selectively adjusting the one or more parameters responsive to determining that the camera of the mobile computing is active.

10. A mobile computing device comprising:
a camera;
a wireless power receiver;
at least one processor; and
at least one non-transitory computer-readable storage medium storing instructions that are executable by the at least one processor to:
cause the wireless power receiver to receive electrical power via a wireless charging link between the mobile computing device and a wireless charging device; and
responsive to an activation state of the camera, selectively adjust one or more parameters of the wireless charging link, wherein wireless charging via the wireless charging link with the adjusted one or more parameters generates less noise in images captured by the camera while the mobile computing device receives electrical power via the wireless charging link than wireless charging with unadjusted one or more parameters, wherein, to selectively adjust the one or more parameters of the wireless charging link, the instructions are executable by the at least one processor to adjust a frequency of the wireless charging link.

11. The mobile computing device of claim 10, wherein, to selectively adjust the one or more parameters of the wireless charging link, the instructions are executable by the at least one processor to:
adjust, responsive to determining that a present frequency of the wireless charging link is included in a list of frequencies to avoid during operation of the camera, a frequency of the wireless charging link.

12. The mobile computing device of claim 10, wherein, to adjust the frequency of the wireless charging link, the instructions are executable by the at least one processor to adjust an amount of power requested by the mobile computing device.

13. The mobile computing device of claim 12, further comprising instructions executable by the at least one processor to:
re-adjust, responsive to determining, after adjusting the amount of power requested, that the present frequency of the wireless charging link is included in the list of frequencies to avoid during operation of the camera, the amount of power requested by the mobile computing device until the present frequency of the wireless charging link is included in the list of frequencies to avoid during operation of the camera.

14. The mobile computing device of claim 12, wherein, to adjust the amount of power requested by the mobile computing device, the instructions are executable by the at least one processor to reduce the amount of power requested by the mobile computing device.

15. The mobile computing device of claim 10, wherein the camera of the mobile computing device is a first camera of the mobile computing device, further comprising instructions executable by the at least one processor to:
adjust, responsive to an activation state of a second camera of the mobile computing device and to determining that the present frequency of the wireless charging link is included in a list of frequencies to avoid during operation of the second camera, the frequency of the wireless charging link.

16. The mobile computing device of claim 10, wherein, to selectively adjust the one or more parameters responsive to the activation state of the camera of the mobile computing device, the instructions are executable by the at least one processor to:
selectively adjust the one or more parameters responsive to determining that the camera of the mobile computing is activated while the mobile computing device is already receiving electrical power via the wireless charging link.

17. The mobile computing device of claim 10, wherein, to selectively adjust the one or more parameters responsive to the activation state of the camera of the mobile computing device, the instructions are executable by the at least one processor to:
selectively adjust the one or more parameters responsive to determining:
selectively adjust the one or more parameters responsive to determining that the mobile computing device has started receiving electrical power via the wireless charging link while the camera of the mobile computing is already activated.

18. The mobile computing device of claim 10, further comprising instructions executable by the at least one processor to:
activate the camera for a video call, wherein, to selectively adjust the one or more parameters responsive to the activation state of the camera of the mobile computing device, the instructions are executable by the at least one processor to:
selectively adjust the one or more parameters responsive to determining that the camera of the mobile computing is active.

19. A non-transitory computer-readable storage medium storing instructions that, when executed, cause at least one processor of a mobile computing device to:
cause a wireless power receiver of the mobile computing device to receive electrical power via a wireless charging link between the mobile computing device and a wireless charging device; and
responsive to an activation state of a camera of the mobile computing device, selectively adjust one or more parameters of the wireless charging link, wherein wireless charging via the wireless charging link with the adjusted one or more parameters generates less noise in images captured by the camera while the mobile computing device receives electrical power via the wireless charging link than wireless charging with unadjusted one or more parameters, wherein the instructions that cause the at least one processor to selectively adjust the one or more parameters of the wireless charging link comprise instructions that cause the at least one processor to adjust a frequency of the wireless charging link by adjusting an amount of power requested by the mobile computing device.

20. The method of claim 19, wherein the instructions that cause the at least one processor to selectively adjust the one or more parameters of the wireless charging link further comprise instructions that cause the at least one processor to:
adjust, responsive to determining that a present frequency of the wireless charging link is included in a list of frequencies to avoid during operation of the camera, the frequency of the wireless charging link by adjusting an amount of power requested by the mobile computing device; and
re-adjust, responsive to determining, after adjusting the amount of power requested, that the present frequency of the wireless charging link is included in the list of frequencies to avoid during operation of the camera, the amount of power requested by the mobile computing device until the present frequency of the wireless charging link is included in the list of frequencies to avoid during operation of the camera.

* * * * *